United States Patent
Buckham

(10) Patent No.: US 11,164,243 B1
(45) Date of Patent: Nov. 2, 2021

(54) SYSTEM, METHOD AND MARKET PLACE FOR SELLING ITEMS IN AN ON-LINE ENVIRONMENT

(71) Applicant: Robin R. Buckham, Silver Spring, MD (US)

(72) Inventor: Robin R. Buckham, Silver Spring, MD (US)

( * ) Notice: Subject to any disclaimer, the term of this patent is extended or adjusted under 35 U.S.C. 154(b) by 219 days.

(21) Appl. No.: 16/228,226

(22) Filed: Dec. 20, 2018

Related U.S. Application Data

(60) Provisional application No. 62/608,091, filed on Dec. 20, 2017.

(51) Int. Cl.
G06Q 30/00 (2012.01)
G06Q 30/08 (2012.01)
G06Q 30/06 (2012.01)

(52) U.S. Cl.
CPC ......... G06Q 30/08 (2013.01); G06Q 30/0641 (2013.01)

(58) Field of Classification Search
None
See application file for complete search history.

(56) References Cited

U.S. PATENT DOCUMENTS

| | | | |
|---|---|---|---|
| 7,062,460 B1 | 6/2006 | Growney et al. | |
| 7,502,757 B2 | 3/2009 | Schmidt | |
| 7,512,558 B1 | 3/2009 | Elad et al. | |
| 7,778,882 B2 | 8/2010 | Chatter et al. | |
| 7,797,220 B2 | 9/2010 | McIntyre | |
| 2002/0194115 A1 | 12/2002 | Nordlicht et al. | |
| 2003/0195822 A1 | 10/2003 | Tatge et al. | |
| 2006/0206412 A1 | 9/2006 | Van Luchene et al. | |
| 2008/0016007 A1 | 1/2008 | Erisman | |
| 2010/0262527 A1 | 10/2010 | Mandigo | |
| 2011/0288951 A1 | 11/2011 | McKenzie | |
| 2012/0203612 A1* | 8/2012 | Mullins | G06Q 30/08 705/14.23 |
| 2012/0265634 A1 | 10/2012 | Kinney | |

(Continued)

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — Dunlap Bennett & Ludwig, PLLC; Brendan E. Squire

(57) ABSTRACT

A leads generating service provider where both buyer and seller get their desired price. The seller lists their sale price and the buyer submits their purchase price, the system determines if a deal is possible based on market demand for the product. This solution is not limited to automobiles. YourPriceAutos improves on the TrueCar.com [and others] concept by creating a unique win/win situation where the seller wins and the buyer wins. The sale price is not negotiated, nor is the purchased price suggested, market demand drive the actual sale/purchase price. We allow the seller to choose his/her sale price and we allow the buyer to submit his/her purchase price, then, our system software determines when the market demand is ideal to enable both the seller and the buyer to get their desired price.

19 Claims, 4 Drawing Sheets

(56) References Cited

U.S. PATENT DOCUMENTS

| | | |
|---|---|---|
| 2012/0296759 A1 | 11/2012 | Shechtman |
| 2013/0254085 A1 | 9/2013 | Tanimoto et al. |
| 2015/0287114 A1 | 10/2015 | Auer |
| 2015/0379626 A1 | 12/2015 | Choudhury et al. |
| 2016/0035029 A1 | 2/2016 | Anwar |
| 2018/0315118 A1* | 11/2018 | Lee ................... G06Q 30/08 |

OTHER PUBLICATIONS

Martin Bernhardt et al.; "An Empirical Analysis of Bidding Fees in Name-your-own-price Auctions"; 2020; Elsevier/Science Direct; Journal of Interactive Marketing 24 (2010) 283-296 (Year: 2010).*

* cited by examiner

SYSTEM, METHOD AND MARKET PLACE FOR SELLING ITEMS IN AN ON-LINE ENVIRONMENT

CROSS-REFERENCE TO RELATED APPLICATION

This application claims the benefit of priority of U.S. provisional application No. 62/608,091, filed Dec. 20, 2017, the contents of which are herein incorporated by reference.

BACKGROUND OF THE INVENTION

The present invention relates to systems and methods for facilitating transactions for goods, and more particularly to systems and methods for facilitating a marketplace for sales of motor vehicles.

Presently in the art, in most cases, the seller's sale price is a negotiated price or the sellers are forced to compete with other sellers in a race to the bottom. Almost always, only one party is happy with the transaction price. However, in many instances, neither the seller nor the buyer is happy with the price.

For example, TrueCar.com is an online marketplace 10 where the sale price is suggested [negotiated] on the seller and the purchase is also imposed [suggested] on the buyer. Other systems suggest what they believe to be a fair price for both seller and buyer. What is presently missing from these marketplaces is a condition where both the buyer and the seller are given the choice to make that decision independently. Market supply and demand is the only influence on the prices within the system.

The defects in current marketplaces are reflected in the following. A few years ago TrueCar.com lost over ⅓ of the sellers, primarily car dealerships, that had registered on their website because the dealerships felt that TureCar.com was forcing dealerships to compete against each in a race to the bottom. In other words, the website favored the buyer only. As a result, TrueCar changed its method so dealerships no longer compete head to head. Instead, the website now suggest a sale price within a range the dealerships are comfortable with. We believe the foregoing revisions simply inverted the marketplace to one where seller is favored and the now buyer is the loser. This reflects a different variant of a win/lose situation.

As can be seen, there is a need for an improved system and method for facilitating transactions for motor vehicles by creating a unique win/win situation where the seller wins and the buyer wins. Our invention created a system where both the seller and the buyer are always happy with the price. The sale price is not negotiated, nor is the purchased price suggested, market demand drives the actual sale/purchase price. We allow the seller to choose his/her sale price and we allow the buyer to submit his/her purchase price, then, our system determines when the market demand is ideal to enable both the seller and the buyer to get their desired price.

SUMMARY OF THE INVENTION

In one aspect of the present invention, an apparatus for programmatically providing a network-based marketplace for an auction in the transaction of goods, is disclosed. The apparatus includes at least one processor and at least one memory including computer program code, the at least one memory and the computer program code configured to, with the at least one processor, cause the apparatus to at least: provide, to a display of a first user device, a first user interface comprising a user interface element configured to receive a first user input for a listing of a product with the network-based marketplace, the listing including one or more identifying indicia for the product, a requested price for the product, and an invoice price for the product; receive the first user input for the one or more identifying indicia, the requested price, and the invoice from the first user device; store the one or more identifying indicia, the requested price, and the cost of goods as an auction item in an auction item database configured to store data associated with the first user input, the auction item database containing a plurality of auction items; provide, on a display of a second user device, a second user interface comprising a user interface element configured to browse the plurality of auction item listings, according to the one or more identifying indicia, and a selection user interface element configured to receive a second user selection of one of the auction items from the plurality of auction items; receive the second user selection; provide, on the second user interface, a bid price user interface element configured to receive the second user input for a bid price for the selected auction item, and a control to submit the bid price, wherein activation of the control charges a bid fee to an account of the second user; receive the bid price for the selected auction item from the second user device; store the bid price as a bid in the auction item database with the data associated with the selected auction item, and accumulate the bid fee in a pool of bids for the selected auction item. The apparatus, dynamically, upon submission of the bid, determines if conditions for a deal for the auction item are present based on the requested price, the invoice price, the bid, and the bid pool, wherein a deal on condition is met: when a highest bid is less than or equal to the invoice price, a bridge amount is at least equal to the bid pool; and when a highest bid is greater than the invoice price, decrementing the bridge amount by a difference between the highest bid and the invoice price, and the decremented bridge amount is at least equal to the bid pool.

In some embodiments, the listing is active for a predetermined temporal period. The apparatus of also includes code to provide a temporal period user interface element configured to receive an input of the predetermined temporal period; and receive the predetermined temporal period.

In some embodiments, the apparatus is further configured to: provide a notification to the first user of the deal on condition. It may also be configured to provide a notification to the second user when the second user has submitted the highest bid.

In other embodiments, the apparatus is configured to provide an action summary to the first user, when the deal on condition is not satisfied at a specified temporal period prior to an end of the auction. The action summary includes one or more of a high bid amount, a total number of bidders, and a number of bidders required for the deal on condition to be satisfied.

The apparatus may also provide, to the display of the first user device, an updated request price user interface element configured to receive an input of a revised request price from the first user. The apparatus may also receive the updated request price from the first user device, store the updated request price in the auction item database with the data associated with the auction item, and determine whether the deal on conditions have been met based on the updated request price.

In yet other embodiments, the apparatus may be further configured to provide a bidder notice to the second user when the deal on condition is not satisfied at a specified temporal period prior to an end of the auction. The bidder notice may include a revised bid element in the user interface of the second device configured to receive the second user input of a revised bid and a control to submit the revised bid price. Activation of the control submits the revised bid and charges the bid fee to the account of the second user for submission of the revised bid.

The apparatus may be, further configured to receive the revised bid from the second user device, store the revised bid in the auction item database with the data associated with the auction item, accumulate the bid fee in the bid pool; and determine whether the deal on conditions have been met based on the revised bid.

Other aspects of the invention include a computer program product configured for providing a network-based marketplace for an auction in the transaction of goods, the computer program product comprising at least one non-transitory computer-readable storage medium having computer-executable program code instructions stored therein, the computer-executable program code instructions comprising program code instructions. The instructions include those to provide, to a display of a first user device, a first user interface comprising a user interface element configured to receive a first user input for a listing of a product with the network-based marketplace.

The listing includes one or more identifying indicia for the product, a requested price for the product, and an invoice price for the product. The first user input is for the one or more identifying indicia, the requested price, and the invoice from the first user device and the one or more identifying indicia, the requested price, and the cost of goods are stored as an auction item in an auction item database configured to store data associated with the first user input, the auction item database containing a plurality of auction items.

A display of a second user device, provides a second user interface including a user interface element configured to browse the plurality of auction item listings, according to the one or more identifying indicia, and a selection user interface element configured to receive a second user selection of one of the auction items from the plurality of auction items. The second user selection is received and a bid price user interface element configured to receive the second user input for a bid price for the selected auction item, is provided and a control to submit the bid price, wherein activation of the control charges a bid fee to an account of the second user. The bid price for the selected auction item is received from the second user device and the bid price is stored as a bid in the auction item database with the data associated with the selected auction item. The bid fee is accumulated in a pool of bids for the selected auction item.

Upon submission of the bid, dynamically determining if conditions for a deal for the auction item are present based on the requested price, the invoice price, the bid, and the bid pool. A deal on condition is met: when a highest bid is less than or equal to the invoice price, a bridge amount representing a difference between the requested amount and the invoice price is at least equal to the bid pool; and when a highest bid is greater than the invoice price, decrementing the bridge amount by a difference between the highest bid and the invoice price, and the decremented bridge amount is at least equal to the bid pool.

In some embodiments, the listing is active for a predetermined temporal period. A temporal period user interface element may be provided that is configured to receive an input of the predetermined temporal period, and the predetermined temporal period may be received.

In other embodiments, the computer-executable program code instructions further include program code instructions for providing a notification to the first user of the deal on condition. A notification may also be provided to the second user when the second user has submitted the highest bid.

An action summary may be provided to the first user, when the deal on condition is not satisfied at a specified temporal period prior to an end of the auction, wherein the action summary includes one or more of a high bid amount, a total number of bidders, and a number of bidders required for the deal on condition to be satisfied. The computer-executable program code instructions further comprise program code instructions for providing, to the display of the first user device, an updated request price user interface element configured to receive an input of a revised request price from the first user. The updated request price may be received from the first user device, stored in the auction item database with the data associated with the auction item; and determine whether the deal on conditions have been met based on the updated request price.

In yet other embodiments, the program code may also include instructions to provide a bidder notice to the second user when the deal on condition is not satisfied at a specified temporal period prior to an end of the auction. The bidder notice may include a revised bid element in the user interface of the second device configured to receive the second user input of a revised bid and a control to submit the revised bid price. Activation of the control submits the revised bid and charges the bid fee to the account of the second user for submission of the revised bid.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide an online marketplace for transactions that enables both a car buyer and seller choose their price. The system and method allows both the buyer and the seller to get the price they desire without any out site influences. The seller lists their sale price and the buyer submits their purchase price, our system and method determines if a deal is possible based on market demand for the product. While described in the context of a marketplace for motor vehicles, this solution is not limited to motor vehicles and may be applied to facilitate transactions in a broad range of marketplaces.

Briefly, the system and method facilitates transactions for motor vehicles by creating a unique win/win situation where both the seller wins and the buyer wins. Within the system, the sale price is not negotiated, nor is the purchased price suggested. Rather, market demand for the motor vehicle drives the actual sale/purchase price. The system allows the seller to choose his/her sale price and the buyer to submit his/her purchase price, then, the system determines when the market demand is ideal to enable both the seller and the buyer to get their desired price.

Figure 1:
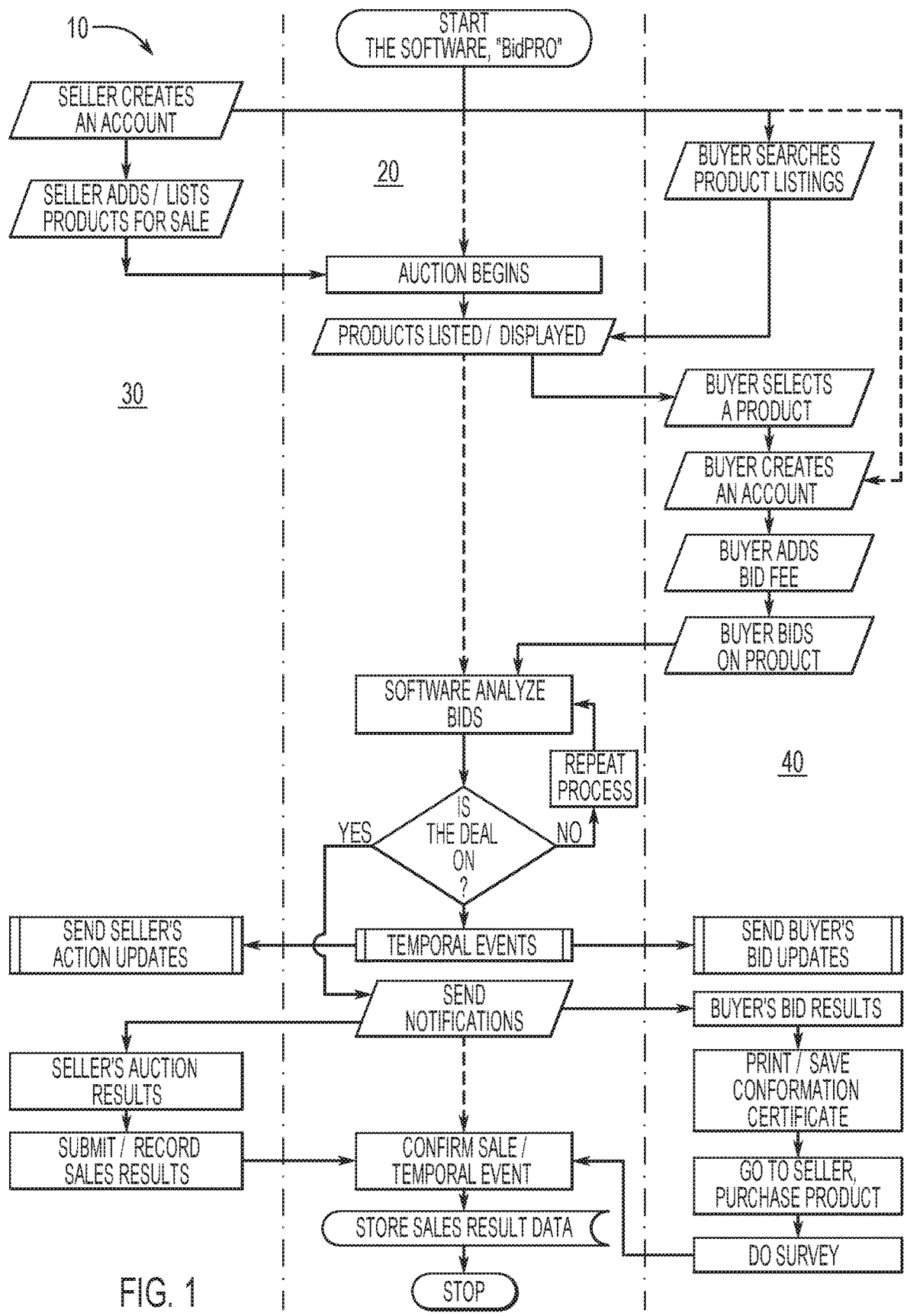
FIG. 1 is a flowchart of the motor vehicle marketplace according to aspects of the present invention.
Figure 2:
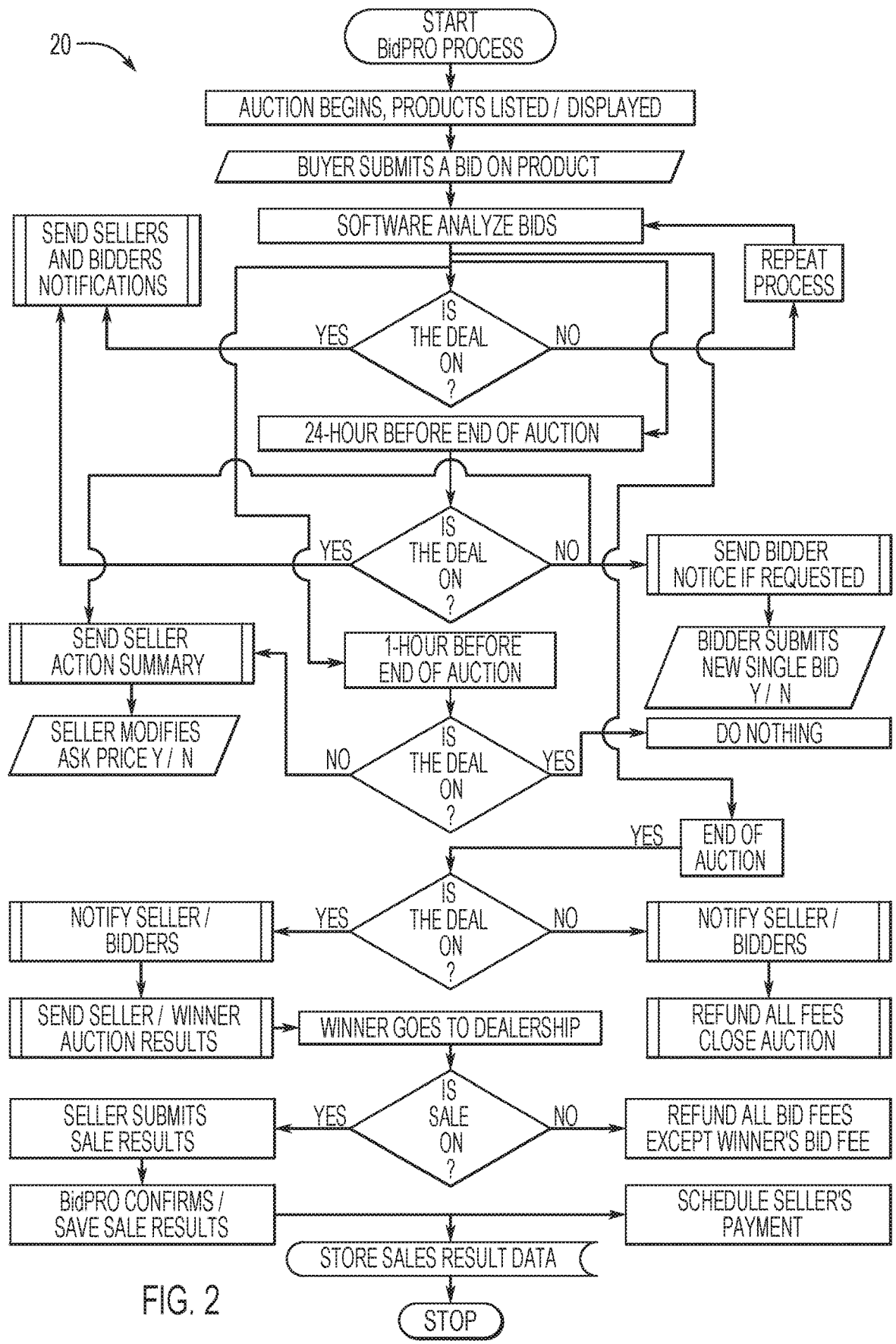
FIG. 2 is a flowchart of the bidding process.
Figure 3:
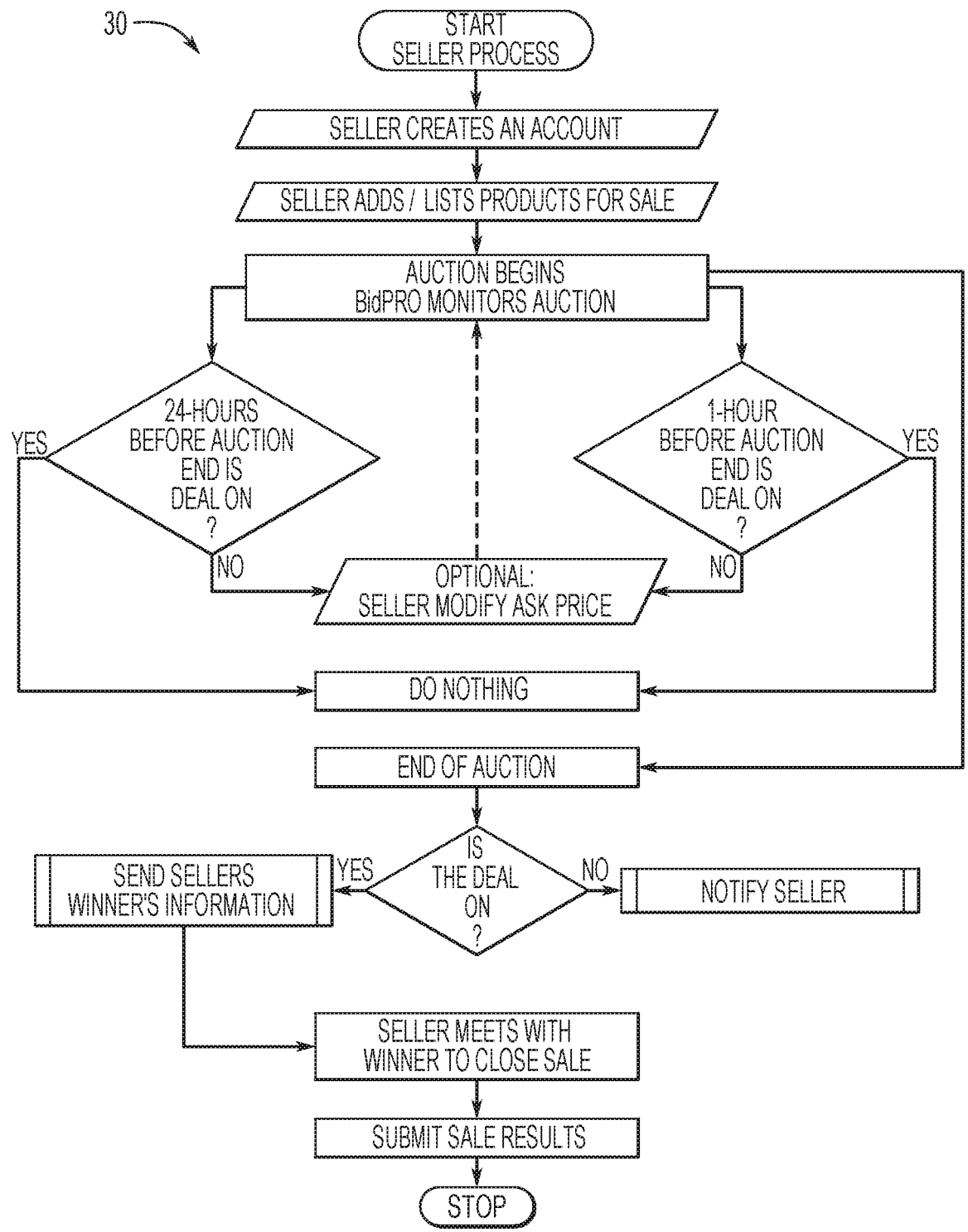
FIG. 3 is a flowchart of the buyer process.

As seen in reference to the flowchart of FIG. 1, the BidPRO system 10 may be configured to operate on a server hosting web pages on a front end of the system 10 for buyers 40 and sellers 30 to access and interact with via a web browser or mobile App. Initially a seller 30 may create an account and after the account is created, may add or list products for sale. When a product is added to the system 10 for sale, the seller 30 will establish a desired selling price. Once a product has been listed for sale, an auction 20 for that item is initiated. The auction 20 may be configured with a temporal parameter specifying a duration, which may specify the number of hours or days that the auction 20 may persist.

From a buyer perspective, the system 10 may also be accessed via a web browser or App and the buyer may view, on a display, one or more items that have had their auctions 20 initiated in the marketplace. The system 10 may also include a user interface for searching, browsing, and selecting a product of interest from the one or more auction items. After selecting the product of interest, the buyer is then prompted to establish an account, or if they already have an account, they may enter their account credentials to be able to bid on the product of interest. In some embodiments of the invention, the buyer may be charged a fee to bid on a product before they are able to bid on the product.

A back end of the system 10 the server is configured with an analysis engine to analyze the bids to determine whether conditions to satisfy a sale, that is a "Deal On" condition, has been reached. For example, the analysis may include a ranking of the current buyer's bid and the number of bids and will determine if a deal point is met by the current buyers' bids. A data analytics engine may also be included to store and perform an analysis of buyer interactions within the site.

The following is a representative example of the system 10 analysis of determining whether a deal is on and the method in which the system 10 facilitates making each of the seller 30 and the buyer achieve their expectations.

By way of non-limiting example, a seller 30, such as a car dealership, would like to sell a car. The car will have a manufacturer's suggested retail price (MSRP) of $31,000. The dealer would submit a requested sale price of $30,000. Again, the buyer 40 and other sellers 30 will not see this price. The dealer may also enter an invoice price to the system 10 to facilitate the making of the deal on mutually agreeable terms. In this example, the car carries an invoice price of $26,000, so the system 10 offers this car for sale to the public for $26,000.

At these prices there is a difference of $4,000 between the invoice price and the requested price in order for the seller 30 to be happy. The $4,000 represents a bridge amount. In current systems, only bidding to the desired sale price of $30,000 satisfy the bridge amount to close the deal.

However, the present invention is designed to close the bridge amount between the seller 30 and one or more buyers 40. According to the analysis engine and operation of the system, the bid fee, for each of the bidders is aggregated to provide a pool of funds to offset the bridge amount. If each bidder were to bid $26,000 or less for the car, the bridge amount would remain at $4000. In this case, the system 10 would need 40 bidders at a $100 bid fee to raise that $4,000. The tied bids would be resolved by order of bidding, i.e. if the high bids are equal, then the first bidder to submit that bid would win.

In another example, assuming the same manufacturer's suggested retail price (MSRP), requested sale price, and invoice price, and the first bid is $28,000 for the car, a decremented bridge amount is only $2000. With the first bidder's bid fee, the bid fees of only 19 more bidders is needed to reach the decremented bridge amount to reach a deal. In this instance, the system 10 would have raised the initial bridge amount of $4,000, by $2,000 from the difference in the $26,000 invoice price and the $28,000 high bid plus the $100 bid fee.

The system 10 is configured so that the algorithm recursively tracks the ability to close the bridge amount to determine when the deal is on. Once the required number of bidders (bid fees) has been reached to close the difference between the highest bid and the asking price have been reached, the parameters for meeting a deal on condition have been reached.

The present system, therefore solves the problems in existing systems since, the high bidder/buyer will be satisfied in paying his bid price of $28,000 as the purchase price because that is the price he/she requested. For the seller 30, the ability of the system 10 to satisfy the bridge amount to attain the asking price satisfies the sellers 30 needs. Thus, the system and method of the present invention provide a win/win situation over the win/lose and lose/win of conventional practices.

The system 10 may also be configured for circumstances where the number of bidders and bid fees exceeds that required to close the bridge amount, then the excess bid fees may be returned to each of the bidders. For example, if the system 10 gets more bidders than is required, 40 required but 80 received, the bid fee amount would be adjusted down to meet the initial bridge dollar amount.

40 bidders×$100=$4,000 required
80 bidders×$100=$8,000 received
$4,000/80=$50 charged Therefore, the new bid fee would be $50 because of the number of bidders over the required amount. With the adjusted bid fee of $50 (the bidders would only be charged $50). The difference between the initial bid fee paid and the adjusted bid fee would be returned or credited to the bidder's account. In this configuration, the system 10 only makes up the difference in the bridge amount and does not make money off the excess bid fees. This configuration encourages the losing bidders to continue bidding on other cars.

During the analysis, the system 10 may also be configured to respond based on one or more temporal events. The one or more temporal events may include notifications to the respective sellers 30 and buyers 40. For example, the system 10 may be configured such that 48 hours prior to the completion of the auction 20, the system 10 may provide an update indicating whether the deal parameters have been satisfied yet.

For example, if a deal is "not-on" at a predetermine time, such as 48 to 24 hours prior to close, the seller 30 may be notified. A summary of the auction 20 is presented, which may include the high bid amount, total number of bidders, additional number of bidders required for the deal to be on. The seller 30 may then adjust his/her sale price to a) complete the deal, b) to move closer to the deal, or c) do nothing, that is make no change to the requested sale price. This may be a onetime offer, where there is a temporal cutoff point where the seller 30 will no longer have access to this option.

In another non-limiting example, at the 24 hour till completion threshold, the system 10 may also send the buyer 40 a personal status update, if the buyer has requested updates during the placing of their bid in the auction 20. In a buyer notification, if the deal is "not-on" at a predetermine time, such as. 24 hours prior to close, and only if the buyer had requested this notification during the submission of his/her initial bid, then the buyer will be given the option to submit a new bid that is greater than his/her previous bid. A new bid fee may be applied here and the previous bid fee is not refunded either.

The expiration of the auction period is another temporal event. Upon the expiration of the auction time, the system 10 determines whether the deal parameters have been met, that is, whether the deal is ON. If the deal parameters have not been met, the auction 20 may be restarted or continued. If the deal parameters have been met, the auction 20 is stopped. The system 10 then sends notifications to the seller 30 and the buyer 40 as auction results and bid results, respectively.

Figure 4:
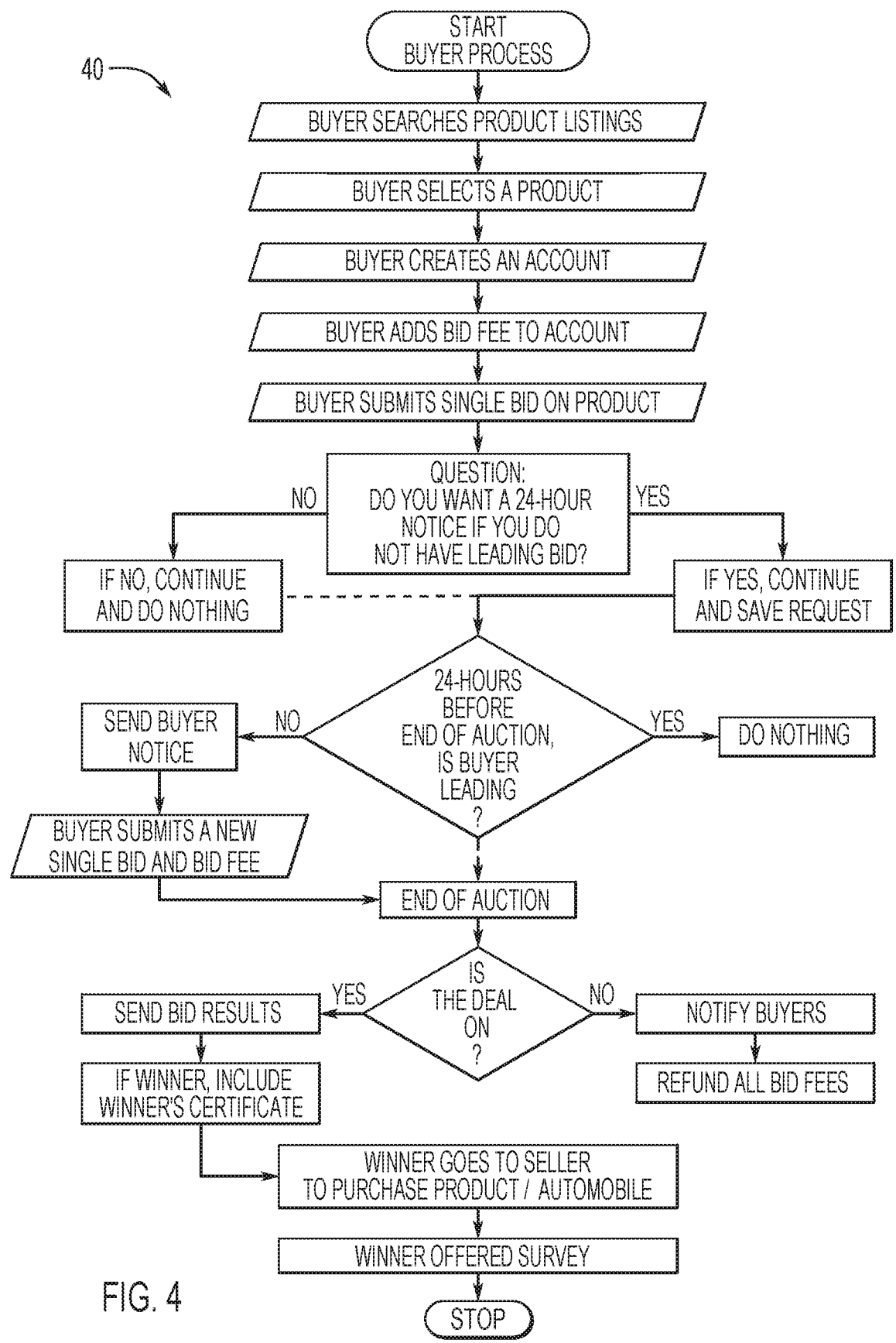
FIG. 4 is a flowchart of the seller process.

For the buyer process 40 shown in FIG. 4, the buyer's bid results will include delivery of a YourPriceAutos (YPA) confirmation certificate indicating that they were the winning bid in the auction. The seller 30 gets a copy of the buyer certificate, which includes the amount due for verification. The buyer 40 may then go to the seller 30 car dealership and purchase the vehicle at the bid price listed on the buyer's certificate. The system 10 may also be configured for the buyer 40 to complete a customer satisfaction survey.

For the seller 30, the seller's auction results notify the seller 30 of the winning bid and the amount of the winning bid so that the same may be verified with the winning buyer's certificate. The Seller 30 then submits and records the sales results. Once submitted, the system 10 pays the seller 30 any remaining deficit difference between the winning bid price and the asking price.

Upon completion of the sale, the sale is reported and verified in the system. The transaction details may also be stored in system databases for later verification or retrieval.

The system 10 described herein, is not a typical/traditional auction. While biding is involved, in this system 10 each potential buyer 40 submits one (1) bid only. The results of the bidding are displayed only after the close of the bidding process/period. The buyer 40 does not get to constantly adjust his or her bid higher based on other bids as would be the case in a conventional auction, since the system 10 precludes the buyers 40 from seeing the other bids. This is more akin to a competitive construction bid where each contractor would submit a sealed fixed bid price. After the close of the bidding period, the architect would review the bids . . . most times the lowest bid is chosen. Unlike these conventional bidding regimens, in the system 10 described herein, the system 10 may also be configured so that a blind adjustment can be made by either the seller 30 and the buyer 40 before the end of the bid period.

The system software is configured to receive the product data initially entered by the Seller 30 and manipulates and displays it to the Buyer 40 in a format similar to an auction where the seller's 30 and the buyer's 40 requested price must be satisfied in order for the deal to be on. It does this by constantly checking each potential buyer's bid submittal and the number of bids against the Seller's price requirements and the system's algorithm. As discussed, both the seller 30 and the buyer 40 can request to be updated on the progress of the auction. If the requirements are met and the deal is on, the buyer 40 gets the right to purchase the product at the winning bid price. The final product sale outcome is recorded and the data is stored and used in the system's analysis tools. Then, the Software completes the B to B transactions between the Seller 30 and system host if applicable. The process is repeated for each product listed for auction.

As will be appreciated, the seller and buyer 40 data types may be changed to perform the same function for a different user and product class. While the system 10 described herein is facilitating the sale of automobiles, however, it could be configured to sell any product or service, similar to what Groupon.com does, as long as they meet our selection requirements. The system 10 of the present invention differs from Groupon.com because both the seller 30 and the buyer 40 get to select their price. However, both the seller 30 and the buyer 40 can adjust their price based on market demand at a selected time during the process.

The system 10 of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud, computer App, Web App, phone App and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. An apparatus for programmatically providing a network-based marketplace for an auction in the transaction of goods, the apparatus comprising:
 a server executing computer program code to host the network based marketplace for the auction in the transaction of goods, the server having at least one processor and at least one memory;
 computer program code executing on the server providing instructions via a communications network, to generate on a display of a first user computing device, a first user interface comprising a listing user interface element configured to receive a first user input for a listing of a product with the network-based marketplace, the listing including one or more identifying indicia for the product, a requested price for the product, and an invoice price for the product;
 computer program code executing on the server receiving, at the server via the communications network, the first user input for the one or more identifying indicia, the requested price, and the invoice price for the product from the first user computing device;
 computer program code executing on the server storing the one or more identifying indicia, the requested price, and the invoice price as an auction item in an auction item database in communication with the server, the auction item database configured to store data associated with the first user input, the auction item database containing a plurality of auction items;
 computer program code executing on the server providing instructions via the communications network, to generate on a display of a second user computing device, a second user interface comprising a browser user interface element configured to browse the plurality of auction item listings contained in the auction item database according to the one or more identifying indicia, and instructions to generate on the display of the second user computing device, a selection user interface element configured to receive a second user selection of a selected one of the auction items from the plurality of auction items;
 computer program code executing on the server receiving via the communications network, the second user selection of the selected one of auction items;
 computer program code executing on the server providing, via the communications network, instructions to generate, on the second user interface, a bid price user interface element configured to receive the second user input for a bid price for the selected auction item, and instructions to generate a control on the bid price user interface element to submit the bid price, wherein activation of the control charges a bid fee to an account of the second user hosted on the server, and submits the bid price for the selected one of the auction items to the server;
 computer program code executing on the server receiving via the communications network, the bid price for the selected auction item from the second user computing device;
 computer program code executing on the server storing the bid price as a bid in the auction item database with the data associated with the selected auction item, and accumulate the bid fee in a bid pool for the selected auction item; and
 computer program code executing on an analysis engine of the server, dynamically determining, upon receipt of the bid, if conditions for a deal for the auction item are present based on the requested price, the invoice price, the bid, the bid pool, and a bridge amount, representing a difference between the requested price and the invoice price, wherein a deal on condition is met:
 when a highest bid is less than or equal to the invoice price, the bid pool is greater than or equal to the bridge amount; and
 when a highest bid is greater than the invoice price, decrementing the bridge amount by a difference between the highest bid and the invoice price to determine a decremented bridge amount, and the bid pool is greater than or equal to the decremented bridge amount; and
 computer program code executing on the server storing the deal on condition in the auction item database.

2. The apparatus of claim 1, wherein the listing is active for a predetermined temporal period.

3. The apparatus of claim 2, further comprising:
 provide a temporal period user interface element configured to receive an input of the predetermined temporal period; and
 receive the predetermined temporal period.

4. The apparatus of claim 2, further configured to:
 provide a bidder notice to the second user when the deal on condition is not satisfied at a specified temporal period prior to an end of the auction, wherein the bidder notice includes a revised bid element in the user interface of the second device configured to receive the second user input of a revised bid and a control to submit the revised bid price, wherein activation of the control submits the revised bid and charges the bid fee to the account of the second user for submission of the revised bid.

5. The apparatus of claim 4, further configured to:
 receive the revised bid from the second user device;
 store the revised bid in the auction item database with the data associated with the auction item;
 accumulate the bid fee in the bid pool; and
 determine whether the deal on conditions have been met based on the revised bid.

6. The apparatus of claim 1, further configured to:
 provide a notification to the first user of the deal on condition.

7. The apparatus of claim 1, further configured to:
 provide a notification to the second user when the second user has submitted the highest bid.

8. The apparatus of claim 1, further configured to:
 provide an action summary to the first user, when the deal on condition is not satisfied at a specified temporal period prior to an end of the auction, wherein the action summary includes one or more of a high bid amount, a total number of bidders, and a number of bidders required for the deal on condition to be satisfied.

9. The apparatus of claim 8, further configured to:
 provide, to the display of the first user device, an updated request price user interface element configured to receive an input of a revised request price from the first user.

10. The apparatus of claim 9, further configured to:
 receive the updated request price from the first user device;
 store the updated request price in the auction item database with the data associated with the auction item; and
 determine whether the deal on conditions have been met based on the updated request price.

11. A computer program product configured for providing a network-based marketplace for an auction in the transaction of goods, the computer program product comprising at least one non-transitory computer-readable storage medium having computer-executable program code instructions stored therein, the computer-executable program code instructions comprising program code instructions for:

provided from a server hosting the network-based marketplace, via a communications network, instructions to a display of a first user device, a first user interface comprising a user interface element configured to receive a first user input for a listing of a product with the network-based marketplace, the listing including one or more identifying indicia for the product, a requested price for the product, and an invoice price for the product;

receiving, via the communications network, at the server hosting the network-based marketplace, the first user input for the one or more identifying indicia, the requested price, and the invoice from the first user device;

storing the one or more identifying indicia, the requested price, and the cost of goods as an auction item in an auction item database, in communication with the server, the auction item database configured to store data associated with the first user input, the auction item database containing a plurality of auction items;

providing, via the communications network, instructions from the server hosting the network-based marketplace, to, a display of a second user device, a second user interface comprising a user interface element configured to browse the plurality of auction item listings, according to the one or more identifying indicia, and a selection user interface element configured to receive a second user selection of one of the auction items from the plurality of auction items;

receiving, at the server, via the communications network, the second user selection of a selected auction item;

providing, via the communications network, instructions from the server hosting the network-based marketplace, a bid price user interface element configured to receive the second user input for a bid price for the selected auction item, and a control to submit the bid price;

receiving, via the communications network, the bid price for the selected auction item from the second user device and charging a bid fee to an account of the second user;

storing the bid price as a bid in the auction item database with the data associated with the selected auction item, and accumulate the bid fee in a bid pool for the selected auction item; and dynamically, upon receipt of the bid, determining, by an analysis engine of the server, if conditions for a deal for the auction item are present based on the requested price, the invoice price, the bid, and the bid pool, wherein a deal on condition is met:

when a highest bid is less than or equal to the invoice price, the bid pool is greater than or equal to a bridge amount representing a difference between the requested price and the invoice price; and when a highest bid is greater than the invoice price, decrementing the bridge amount, representing a difference between the requested price and the invoice price, by a difference between the highest bid and the invoice price, and the bid pool is greater than or equal to the decremented bridge amount.

12. The computer program product of claim 11, wherein the listing is active for a predetermined temporal period.

13. The computer program product of claim 12, wherein the computer-executable program code instructions further comprise program code instructions for:

providing a temporal period user interface element configured to receive an input of the predetermined temporal period; and receiving the predetermined temporal period.

14. The computer program product of claim 12, wherein the computer-executable program code instructions further comprise program code instructions for:

providing a notification to the first user of the deal on condition.

15. The computer program product of claim 12, wherein the computer-executable program code instructions further comprise program code instructions for:

providing a notification to the second user when the second user has submitted the highest bid.

16. The computer program product of claim 12, wherein the computer-executable program code instructions further comprise program code instructions for:

providing an action summary to the first user, when the deal on condition is not satisfied at a specified temporal period prior to an end of the auction, wherein the action summary includes one or more of a high bid amount, a total number of bidders, and a number of bidders required for the deal on condition to be satisfied.

17. The computer program product of claim 16, wherein the computer-executable program code instructions further comprise program code instructions for:

provide, to the display of the first user device, an updated request price user interface element configured to receive an input of a revised request price from the first user.

18. The computer program product of claim 17, wherein the computer-executable program code instructions further comprise program code instructions for:

receive the updated request price from the first user device;

store the updated request price in the auction item database with the data associated with the auction item; and determine whether the deal on conditions have been met based on the updated request price.

19. The computer program product of claim 12, wherein the computer-executable program code instructions further comprise program code instructions for:

provide a bidder notice to the second user when the deal on condition is not satisfied at a specified temporal period prior to an end of the auction, wherein the bidder notice includes a revised bid element in the user interface of the second device configured to receive the second user input of a revised bid and a control to submit the revised bid price, wherein activation of the control submits the revised bid and charges the bid fee to the account of the second user for submission of the revised bid.

* * * * *